J. MARTIN.
ANIMAL-TRAP.
No. 181,086. Patented Aug. 15, 1876.
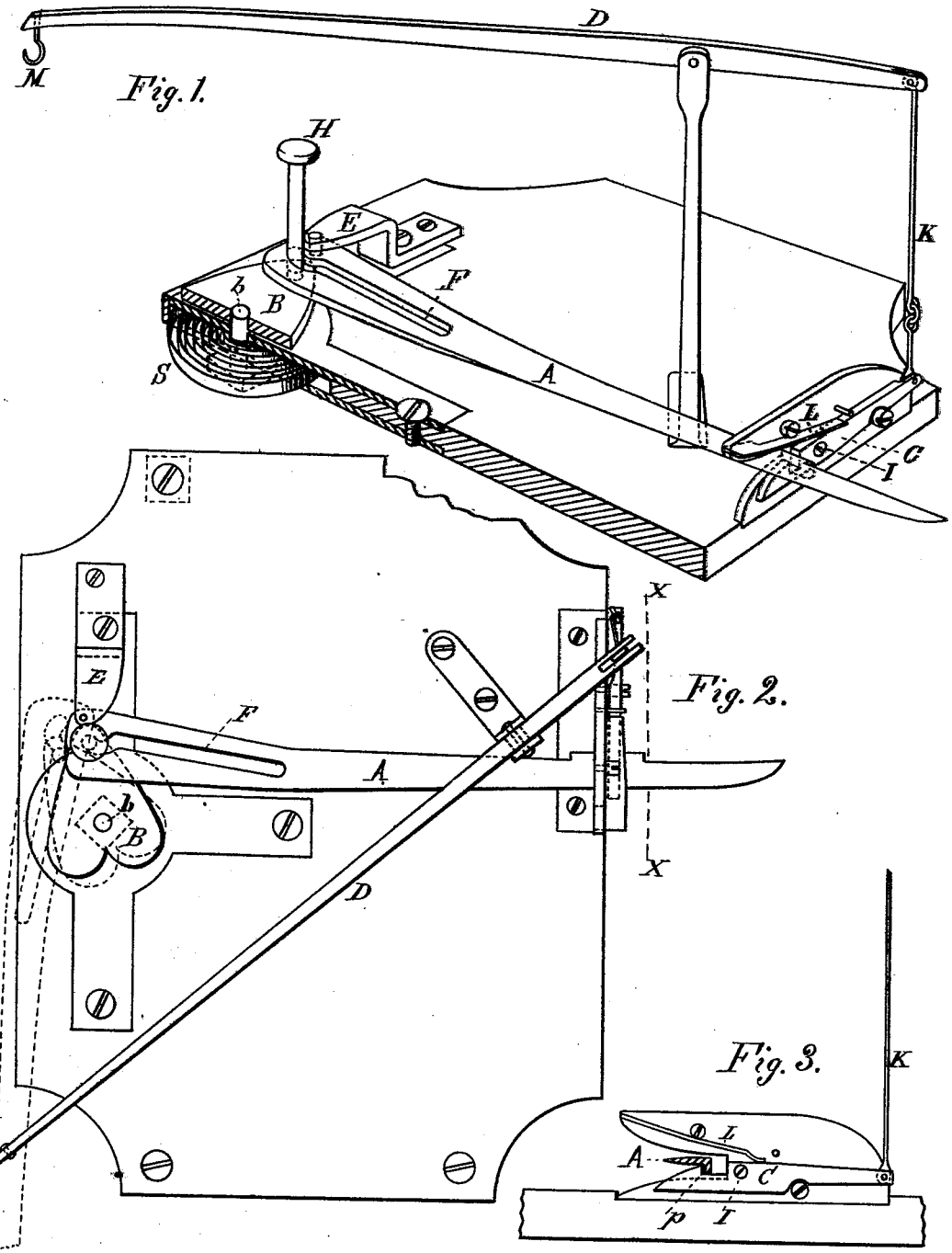
WITNESSES
Villette Anderson.
Story B. Ladd
INVENTOR
Josiah Martin
By Paine & Grafton ATTORNEYS

UNITED STATES PATENT OFFICE.

JOSIAH MARTIN, OF PALESTINE, TEXAS.

IMPROVEMENT IN ANIMAL-TRAPS.

Specification forming part of Letters Patent No. 181,086, dated August 15, 1876; application filed June 11, 1876.

*To all whom it may concern:*

Be it known that I, JOSIAH MARTIN, of Palestine, in the county of Anderson and State of Texas, have invented certain new and useful Improvements in Animal-Traps; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to kill or wound rats, mice, and game—the size and strength of the trap being adapted to the size of the animals sought.

Figure 1 of the drawings is a perspective view of my invention with a part of the baseboard removed. Fig. 2 is a plan of the same, and Fig. 3 is a side view of the catch or trigger arrangement.

The knife-blade A is pivoted at one end to a firm support, E, and the other end has a projection, p, on the back of the under side near the point, which is caught and held by the spring catch or trigger C when the trap is set. The blade A has a slot, F, through which projects, H, a crank pin or handle attached to the lever plate or crank B. The crank B turns about the axis b, and to this axis is attached one end of a coiled spring, S, the other end being attached to the body of the trap, so that to coil the spring the handle H must be turned to the left. The trigger C, turning on the pivot I, is held up by the spring L, and is controlled by the cord or wire K, which is fastened to one end of the lever D, the bait being fastened to the other. This lever D is placed so as to bring the bait over that portion of the field covered by the stroke of the knife where the blow will be most effective. To set the trap the blade A is released from the catch C, and the spring is coiled by turning the handle H to the left, the blade being allowed to follow the motions of the handle, as shown by the dotted lines in Fig. 2. When the spring is coiled tight, the blade A is brought back and caught by the catch C, and the bait is attached. Then, if the end M of the bait-lever is drawn down by any animal nibbling at the bait, the catch C releases the blade A, and the spring S, acting through the crank B, causes the blade to strike and readjust itself after each stroke, ready for another animal, as many times as there have been revolutions of the handle in coiling the spring, thereby effectually killing or disabling any animal that may disturb the trap.

I claim as my invention—

The combination of the knife-blade A, having the slot F and projection p, the spring S, lever B, catch C, and bait-lever D, when constructed substantially as herein described, and for the purposes set forth.

In testimony that I claim the foregoing as my own I affix my signature in presence of two witnesses.

JOSIAH MARTIN.

Witnesses:
R. McCLURE,
ANDW. S. DONNAN.